(12) United States Patent
Ironmonger et al.

(10) Patent No.: US 10,220,308 B2
(45) Date of Patent: Mar. 5, 2019

(54) GAMES CONTROLLER AND TRIGGER THEREFOR

(71) Applicant: Ironburg Inventions Ltd., Wincanton, Somerset (GB)

(72) Inventors: Duncan Ironmonger, Atlanta, GA (US); Carl S. Jeffrey, Rochester (GB)

(73) Assignee: Ironburg Inventions Ltd., Wincanton (GB)

( * ) Notice: Subject to any disclaimer, the term of this patent is extended or adjusted under 35 U.S.C. 154(b) by 0 days.

(21) Appl. No.: 15/362,134

(22) Filed: Nov. 28, 2016

(65) Prior Publication Data

US 2017/0151494 A1    Jun. 1, 2017

Related U.S. Application Data

(60) Provisional application No. 62/260,394, filed on Nov. 27, 2015.

(51) Int. Cl.
| | |
|---|---|
| *A63F 9/24* | (2006.01) |
| *A63F 13/24* | (2014.01) |
| *H01H 9/02* | (2006.01) |
| *A63F 13/22* | (2014.01) |

(52) U.S. Cl.
CPC .............. *A63F 13/24* (2014.09); *A63F 13/22* (2014.09); *H01H 9/0214* (2013.01)

(58) Field of Classification Search
CPC .................................. A63F 13/24; A63F 13/98
See application file for complete search history.

(56) References Cited

U.S. PATENT DOCUMENTS

| | | |
|---|---|---|
| 4,032,728 A | 6/1977 | Oelsch |
| 4,786,768 A | 11/1988 | Langewis et al. |
| 5,430,262 A | 7/1995 | Matsui et al. |
| 5,451,053 A | 9/1995 | Garrido |
| 5,773,769 A | 6/1998 | Raymond |
| 5,841,372 A | 11/1998 | Matsumoto |
| 5,874,906 A | 2/1999 | Willner et al. |

(Continued)

FOREIGN PATENT DOCUMENTS

| | | |
|---|---|---|
| CN | 202 528 096 U | 11/2012 |
| CN | 203 077 157 U | 7/2013 |

(Continued)

OTHER PUBLICATIONS

World Intellectual Property Office, International Search Report, PCT/GB2016/053712 (dated Feb. 27, 2017).

(Continued)

*Primary Examiner* — Steve Rowland
(74) *Attorney, Agent, or Firm* — Walters & Wasylyna LLC (57) ABSTRACT

Aspects of the disclosure relate to a games controller for controlling electronic games, input device for a computer program and a trigger mechanism therefor. The trigger mechanism comprises a trigger body having a plurality of walls defining an internal chamber. The plurality of walls include a base wall and an orifice defined in the base wall. A detent is detachably mounted on the trigger body. The detent is at least partially received in the orifice and the detent is rotatable with respect to the trigger body. The detent comprises at least one abutment surface which is eccentrically arranged with respect to the rotational axis of the detent.

18 Claims, 12 Drawing Sheets

(56) References Cited

U.S. PATENT DOCUMENTS

| | | | |
|---|---|---|---|
| 5,989,123 A | 11/1999 | Tosaki et al. | |
| 6,053,814 A * | 4/2000 | Pchenitchnikov | A63F 13/06 273/148 B |
| 6,203,432 B1 | 3/2001 | Roberts et al. | |
| 6,251,015 B1 | 6/2001 | Caprai | |
| 6,512,511 B2 | 1/2003 | Willner et al. | |
| 6,752,719 B2 | 6/2004 | Himoto et al. | |
| 6,760,013 B2 | 7/2004 | Willner et al. | |
| 6,853,308 B1 | 2/2005 | Dustin | |
| 7,510,477 B2 | 3/2009 | Argentar | |
| 7,758,424 B2 | 7/2010 | Riggs et al. | |
| 7,859,514 B1 | 12/2010 | Park | |
| 8,641,525 B2 | 2/2014 | Burgess et al. | |
| 8,777,620 B1 | 7/2014 | Baxter | |
| 9,089,770 B2 | 7/2015 | Burgess et al. | |
| 9,804,691 B1 | 10/2017 | Strahle et al. | |
| 2001/0003713 A1 | 6/2001 | Willner et al. | |
| 2001/0025778 A1 | 10/2001 | Ono | |
| 2002/0052237 A1 | 5/2002 | Magill | |
| 2002/0128064 A1 | 9/2002 | Sobota | |
| 2003/0067111 A1 | 4/2003 | Swan | |
| 2004/0259059 A1 | 12/2004 | Aoki | |
| 2005/0083297 A1 | 4/2005 | Duncan | |
| 2005/0124416 A1 * | 6/2005 | Hammond | A63F 13/06 463/37 |
| 2005/0215321 A1 | 9/2005 | Hussaini et al. | |
| 2005/0230230 A1 | 10/2005 | Ueshima et al. | |
| 2005/0255915 A1 | 11/2005 | Riggs et al. | |
| 2005/0255918 A1 * | 11/2005 | Riggs | A47C 3/16 463/37 |
| 2006/0025217 A1 | 2/2006 | Hussaini et al. | |
| 2006/0116204 A1 | 6/2006 | Chen et al. | |
| 2007/0281787 A1 | 12/2007 | Numata et al. | |
| 2008/0261695 A1 | 10/2008 | Coe | |
| 2009/0088250 A1 | 4/2009 | Carlson | |
| 2009/0258705 A1 | 10/2009 | Guinchard | |
| 2010/0073283 A1 | 3/2010 | Enright | |
| 2010/0267454 A1 | 10/2010 | Navid | |
| 2010/0304865 A1 | 12/2010 | Picunko | |
| 2011/0256930 A1 | 10/2011 | Jaouen | |
| 2011/0281649 A1 | 11/2011 | Jaouen | |
| 2012/0088582 A1 | 4/2012 | Wu et al. | |
| 2012/0142418 A1 * | 6/2012 | Muramatsu | A63F 13/24 463/37 |
| 2012/0142419 A1 | 6/2012 | Muramatsu | |
| 2012/0260220 A1 | 10/2012 | Griffin | |
| 2012/0299244 A1 | 11/2012 | Rice et al. | |
| 2012/0322553 A1 | 12/2012 | Burgess et al. | |
| 2012/0322555 A1 | 12/2012 | Burgess et al. | |
| 2013/0147610 A1 | 6/2013 | Grant et al. | |
| 2013/0150155 A1 | 6/2013 | Barney et al. | |
| 2013/0196770 A1 | 8/2013 | Barney et al. | |
| 2014/0274397 A1 | 9/2014 | Sebastian | |
| 2015/0234479 A1 | 8/2015 | Schantz et al. | |
| 2015/0238855 A1 * | 8/2015 | Uy | G06F 3/0338 463/37 |
| 2016/0082349 A1 | 3/2016 | Burgess et al. | |
| 2016/0193529 A1 | 7/2016 | Burgess et al. | |
| 2016/0320858 A1 * | 11/2016 | Rubio | A63F 13/24 |
| 2016/0325177 A1 * | 11/2016 | Antonio | A63F 13/24 |
| 2016/0346682 A1 | 12/2016 | Burgess et al. | |
| 2016/0351362 A1 * | 12/2016 | Tsai | H01H 21/22 |
| 2017/0001107 A1 | 1/2017 | Burgess et al. | |
| 2017/0001108 A1 | 1/2017 | Burgess et al. | |
| 2017/0087456 A1 | 3/2017 | Burgess et al. | |
| 2017/0151494 A1 | 6/2017 | Ironmonger et al. | |
| 2017/0157509 A1 | 6/2017 | Burgess et al. | |

FOREIGN PATENT DOCUMENTS

| | | |
|---|---|---|
| EP | 1 208 883 | 5/2002 |
| EP | 1852162 | 11/2007 |
| EP | 2 479 636 | 7/2012 |
| EP | 2 440 438 | 4/2013 |
| EP | 2 698 185 | 2/2015 |
| GB | 2 244 546 | 12/1991 |
| GB | 2 481 633 | 1/2012 |
| JP | H1020951 | 1/1998 |
| JP | 2001 084077 | 3/2001 |
| WO | WO 02/34345 | 5/2002 |
| WO | WO 03/046822 | 6/2003 |
| WO | WO 2008/131249 | 10/2008 |
| WO | WO 2012/036710 | 3/2012 |
| WO | WO2014/187923 | 11/2014 |
| WO | 2015004261 | 1/2015 |
| WO | 2015110553 | 7/2015 |

OTHER PUBLICATIONS

International Search Report, PCT/EP2015/052448 (dated 2015).
International Search Report, PCT/EP2015/051290 (dated 2015).
International Search Report, PCT/EP2014/075851 (dated 2015).
International Search Report, PCT/EP2014/075861 (dated 2015).
International Search Report, PCT/EP2014/060587 (dated 2014).
International Search Report, PCT/EP2015/058096 (dated 2015).
Written Opinion of the International Searching Authority, PCT/EP2015/058096 (dated 2015).
Burns, "Review: Scuf Xbox 360 Controller," Xboxer360.com (2010).
Combined Search and Examination Report, GB1011078.1 (dated 2011).
"Rapid Fire Mod for Wireless Xbox 360 Controller," forum on xbox-scene.com, (2008).
"Thrustmaster USB game controller roundup," dansdata.com/tmsticks.htm (2002).
Coles, Olin, "Thrustmaster Run-N-Drive PC/PS3 Wireless Gamepad" BenchmarkReviews.com (2009).
Office Action, U.S. Appl. No. 14/832,211 (dated 2015).
Office Action, U.S. Appl. No. 14/736,771 (dated 2015).
Office Action, U.S. Appl. No. 14/805,597 (dated 2015).
Office Action, U.S. Appl. No. 14/805,641 (dated 2015).
Corrected Petition for Inter Partes Review of U.S. Pat. No. 9,089,770, Under 37 C.F.R. § 42.100, filed by Valve Corporation, Case IPR2016-00949 (2016).
Corrected Petition for Inter Partes Review of U.S. Pat. No. 8,641,525, Under 37 C.F.R. § 42.100, filed by Valve Corporation, Case IPR2016-00948 (2016).
Xbox 360 Wireless Controller Tour, published on May 13, 2005 at http://www.ign.com/articles/2005/05/13/xbox-360-wireless-controller-tour.

* cited by examiner

GAMES CONTROLLER AND TRIGGER THEREFOR

PRIORITY

This application claims priority from U.S. Ser. No. 62/260,394 filed on Nov. 27, 2015, the entire contents of which are incorporated herein by reference.

FIELD

The invention relates to controllers for controlling the play of computerized games and to a trigger mechanism for a games controller. More particularly, but not exclusively, the invention relates to an adjustable actuator system, such as a trigger button, of a game controller for a gaming console and to a method of adjusting the range of travel of an actuator.

BACKGROUND

There are many different types of gaming consoles currently available for operating a video game. For example, Microsoft®, Sony® and Nintendo® manufacture the Xbox®, PlayStation® and Wii® gaming consoles, respectively. The gaming consoles typically include a game controller so that a user can control the operation of the video game.

Some known game controllers include a form of actuator system for the operation of control of the functions of the video games. Actuators, buttons or other depressible or manually operable devices are typically used for controlling discrete actions such as the firing of a weapon or an attack command. It is known to provide a button or actuator which is intended to be operable by the index finger of a user; such buttons are commonly known as triggers.

At times, dependent upon the video game being played, it can be necessary to depress the trigger a distance before the trigger initiation point is reached and the command actually acknowledged. This renders part of the depressing action futile. Likewise, after the command has been operated, it is often possible to carry out further depression of the trigger past the trigger initiation point. This further depression is unnecessary and may also be disadvantageous.

Furthermore, in other situations in some video games, the strength of a command is increased or decreased dependent upon how frequently the trigger is depressed. As such, depressing the trigger the whole distance is unnecessary and excessive for the command or operation required.

It is desirable to have a controller, particularly for gaming applications, that is more responsive or has less scope for allowing unnecessary over-movement by the user of the controller. It is also desirable to provide a trigger mechanism which can be readily adjusted dependent upon the game being controlled to alter the degree of travel of the trigger mechanism.

Due to the rapidly expanding gaming market and development of involved games invoking considerable player input, it is desirable for players to be able to customize their controllers in order to gain increased control in a variety of gaming circumstances.

Games controllers may comprise a haptic feedback system such as a vibrating or rumble motor (an off-centered or eccentric weight attached to the rotational shaft of the motor that causes the motor to wobble or vibrate). Such a haptic feedback system may be mounted or disposed with the trigger body or chassis. It is an object of the present invention to provide an adjustable trigger mechanism which can accommodate a haptic feedback system.

The present invention seeks to improve upon or at least mitigate some of the problems associated with controllers of the prior art by providing a game controller, which includes an adjustable trigger system that has a mechanism to allow the end user to control or recalibrate the maximum and/or minimum trigger positions.

SUMMARY

There are a variety of different commands available for the trigger functions of a game controller, and the adjustable trigger system of the present invention now provides users with the option to customize the trigger settings to suit the individual game at the time of operation.

In some embodiments the trigger system includes adjustments for the amount that the trigger is depressed before there is no more motion available to be made by the operator. This removes any unnecessary distance travelled by the trigger.

The present invention provides a method of controlling the amount of available motion of a trigger system dependent upon the gaming circumstances.

According to a first aspect of the invention, there is provided a trigger mechanism for a games controller for controlling electronic games, the trigger mechanism comprising:

a trigger body having a plurality of walls defining an internal chamber, the plurality of walls including a base wall and an orifice defined in the base wall;

a detent detachably mounted on the trigger body, the detent at least partially received in the orifice and wherein the detent is rotatable with respect to the trigger body;

the detent comprising at least one abutment surface, eccentrically arranged with respect to the rotational axis of the detent.

Optionally, the detent comprises a push fitting for securing the detent to the trigger body.

Optionally, the detent is rotatable between a first position and a second position.

Optionally, in the first position the detent is stowed within the interior chamber of the trigger body.

Optionally, the detent comprises a pair of oppositely disposed trunnions receivable in a partial cylinder provided by a receiver disposed within the interior chamber.

Optionally, the detent comprises a pair of opposing surfaces.

Optionally, the detent is rotatable about an axis which extends through the base wall.

Optionally, the detent rotates about an axis substantially perpendicular to the plane of the base wall.

Optionally, the detent rotates about an axis extending substantially radially from an outer surface of the base wall.

Optionally, the detent is toollessly detachable from the trigger body.

Optionally, the at least one abutment surface is rotatable from a first position and a second position, the abutment surface being disposed in closer proximity to the rotational axis of the detent in the second position than in the first position.

Optionally, a trigger mechanism comprises a face plate detachably mounted to the trigger body and wherein the detent is disposed behind the face plate.

According to a second aspect of the invention, there is provided an apparatus for supplying user inputs to a computer program, such as a game program, for controlling the game program, the apparatus comprising at least one depressible trigger mechanism, the trigger mechanism comprising a trigger body having a detent for manual adjustment of the depressible range of the trigger mechanism;

the trigger body comprising a plurality of walls, including a base wall, the plurality of walls defining an interior chamber of the trigger body;

the base wall comprising an orifice for receiving at least in part the detent, the detent being detachably mounted to the trigger body and being rotatable with respect to the trigger body, the detent comprising at least one abutment surface eccentrically arranged with respect to the rotational axis of the detent.

Optionally, the detent is rotatable between a first position and a second position, the trigger mechanism being depressible through a first range when the detent is in the first position and through a second range when the detent is in the second position, the second range being shorter than the first range.

Optionally, the apparatus comprises a casing wherein rotation of the detent through 180 degrees rotates a first one of the abutment surfaces from a position facing towards the casing to a position facing away from the casing.

Optionally, the detent comprises a pair of opposed abutment surfaces.

Optionally, the apparatus is a hand held controller for a games console comprising an outer case, and a plurality of controls are located on a front and a top of the controller; the controller being shaped to be held in both hands of a user such that the user's thumbs are positioned to operate controls located on the front of the controller and the user's index fingers are positioned to operate controls located on the top of the controller.

According to a third aspect of the invention, there is provided a trigger mechanism for a games controller for controlling electronic games, the trigger mechanism comprising:

a trigger body having a plurality of walls including a front wall, the plurality of walls defining an interior chamber of the trigger body, the front wall comprising an inner surface and an outer surface;

an actuator comprising a first component mounted on the inner surface of the front wall;

a bore extending from the outer surface of the front wall to the interior chamber and defining a bore within the first component coupled to a second component coupled to the first component and a screw thread for adjusting the position of the second component with respect to the first component.

Optionally, the second component comprises an external screw thread and is rotatably mounted within the bore.

Optionally, the second component comprises a first end forming an abutment surface.

Optionally, the first component comprises an external thread and the second component comprises an internal thread which receives the external thread of the first component and the bore provides access to a screw drive enabling torque to be applied to the second component.

Optionally, the second component is in communication with a transducer, and wherein adjustment of the position of the second component with respect to the first component affects an electrical characteristic of the transducer.

Optionally, the second component comprises an abutment surface for abutment with a transducer.

Optionally, the transducer is a pressure sensor.

Optionally, the second component comprises a magnet for actuating a magnetic sensor.

Optionally, the second component is coupled to a potentiometer so as to adjust an electrical characteristic of the potentiometer.

Optionally, the trigger mechanism further comprises a face plate detachably mounted to the trigger body, the face plate concealing the orifice in the front wall.

Optionally, there is provided an apparatus for supplying user inputs to a computer program, such as a game program, for controlling the game program, the apparatus comprising at least one depressible trigger mechanism.

Optionally, the apparatus further comprises the trigger mechanism.

Within the scope of this application it is envisaged and intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Exemplary embodiments of the invention will now be described with reference to the accompanying drawings, in which.

DETAILED DESCRIPTION

Detailed descriptions of specific embodiments of the games controller and its trigger mechanism are disclosed herein. It will be understood that the disclosed embodiments are merely examples of the way in which certain aspects of the invention can be implemented and do not represent an exhaustive list of all of the ways the invention may be embodied. Indeed, it will be understood that the games controller and its trigger mechanism described herein may be embodied in various and alternative forms. The Figures are not necessarily to scale and some features may be exaggerated or minimized to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
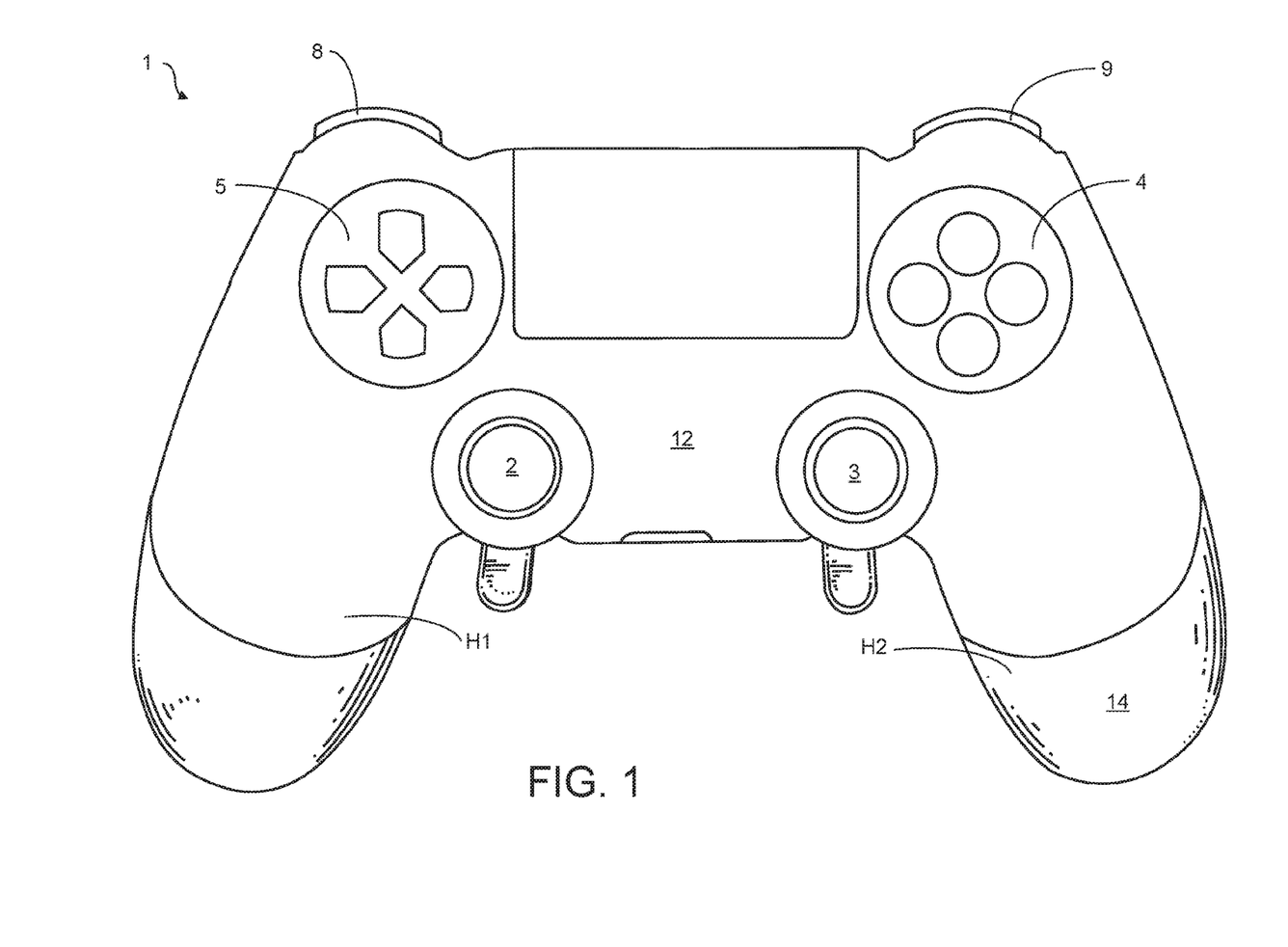
FIG. 1 is a schematic illustration from above of the front of a games console controller according to the present invention.
Figure 2:
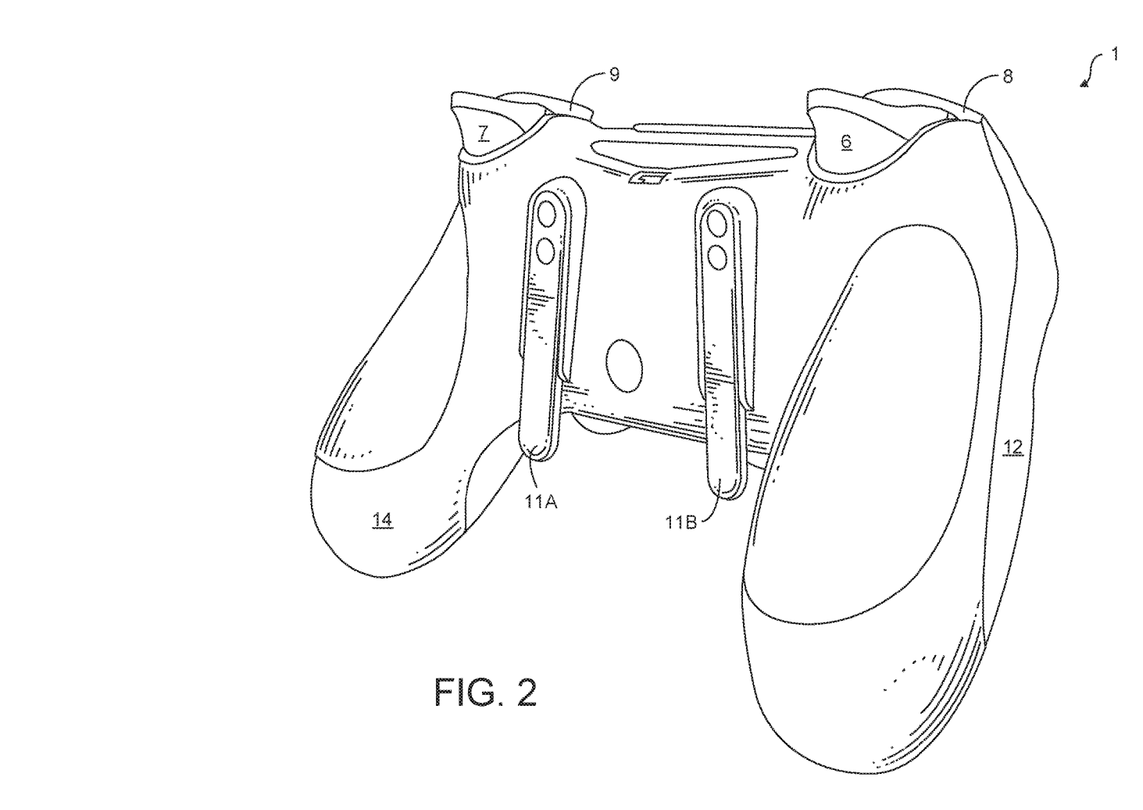
FIGS. 2 and 3 are perspective views from below of the rear panel of a games console controller according to a first embodiment.

Referring to FIGS. 1 and 2 there is shown a controller 1 according to an embodiment of the present invention. FIG. 1 shows the controls which are mounted on the front and FIG. 2 shows the controls mounted on the top of the controller 1. Specifically, the front of the controller 1 is provided with left and right analogue thumb sticks 2, 3 which normally control movement and are intended to be operated by the user's left and right thumbs respectively. There are four buttons 4, located on a forward-right portion of the controller 1, which normally control additional actions and are intended to be operated by the user's right thumb. There is a direction pad 5 located on a forward-left portion of the front of the controller 1. The direction pad 5 is intended to be operated by the user's left thumb, typically either as an alternative to the left thumb stick 2 or to provide additional actions. There are a left trigger 6, a right trigger 7, a left bumper 8 and a right bumper 9 located on the front of the controller 1, see FIG. 2. The left and right triggers 6, 7 are typically operated by a user's index fingers. The left and right bumpers 8, 9 may also be operated by a user's index fingers.

FIG. 2 illustrates a back of the controller 1. Two paddle levers 11A, 11B, are mounted to the back of the controller 1. The paddle levers 11A, 11B are configured to replicate the function of one or more of the controls provided upon the front of the controller 1. The paddle levers 11A, 11B are mounted to a housing 12 by a mechanical fixing.

The housing 12 defines a pair of handles H1, H2 which a user may grasp when operating the controller 1. The paddle levers 11A, 11B are configured to be operated by a middle finger of an operator which is wrapped around the handles H1, H2.

Figure 3:
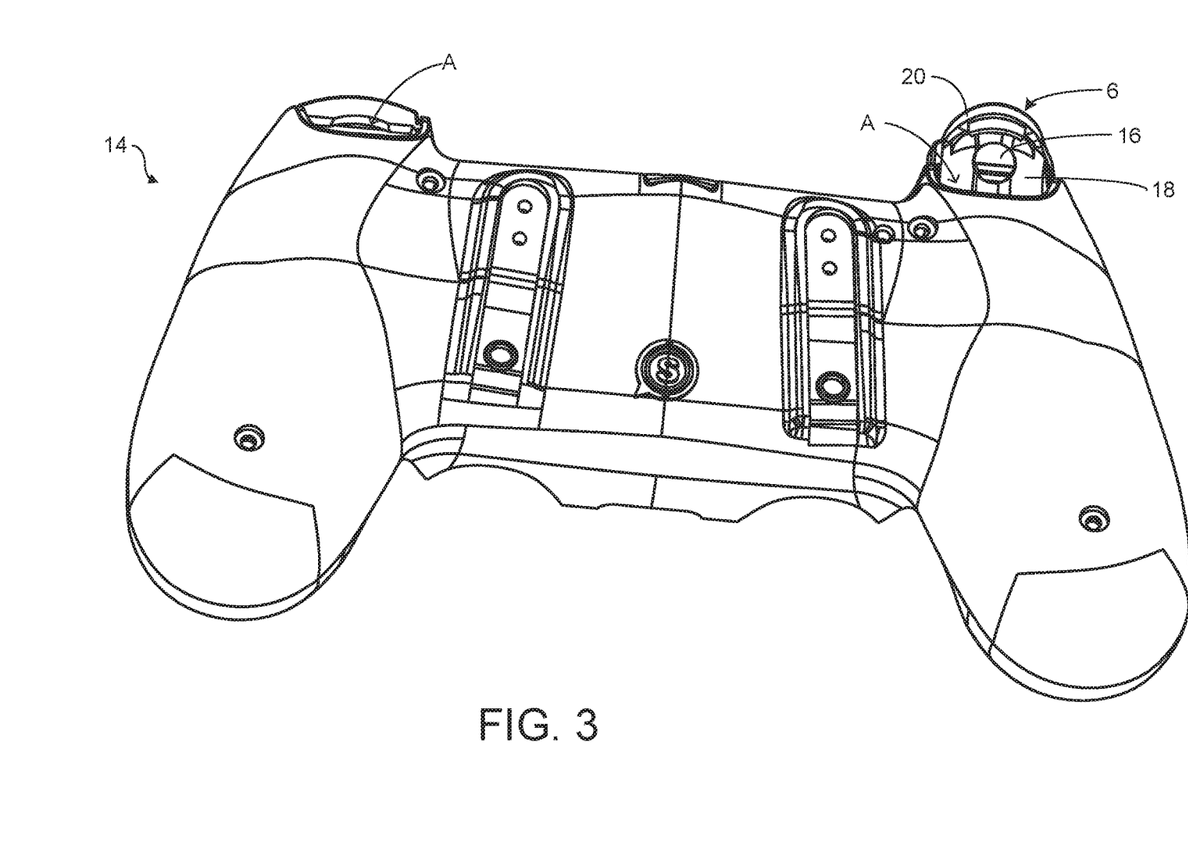

FIG. 3 illustrates a back panel 14 of the controller; the back panel 14 forms a part of the body or housing 12 of the controller 1. The housing 12 comprises a pair of apertures A in a top edge thereof. The apertures may be defined entirely within the back panel 14 or in part in the back panel 14. An actuator, in the form of a trigger mechanism 6, extends through each aperture A; one of the trigger mechanisms has been omitted from FIG. 3 for illustrative purposes. FIG. 3 illustrates a left trigger mechanism 6 extending through one of the apertures A.

Figure 4:
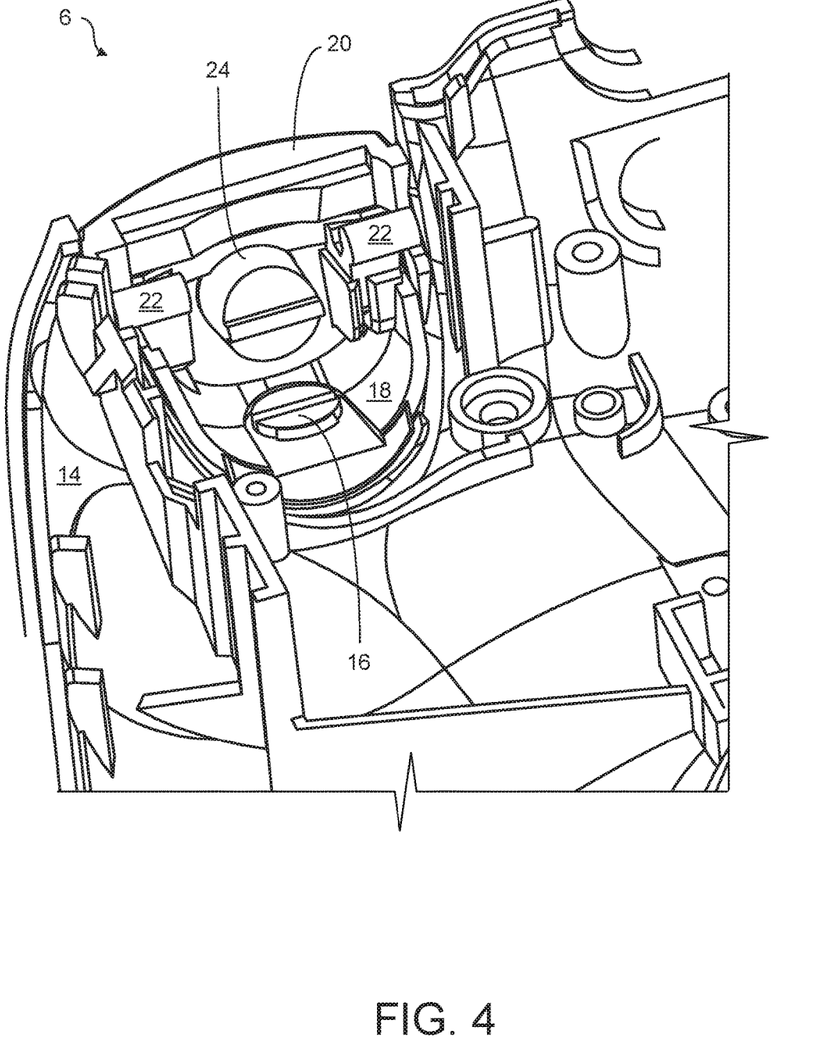
FIG. 4 is an internal view of a trigger mechanism according to a first embodiment.
Figure 5:
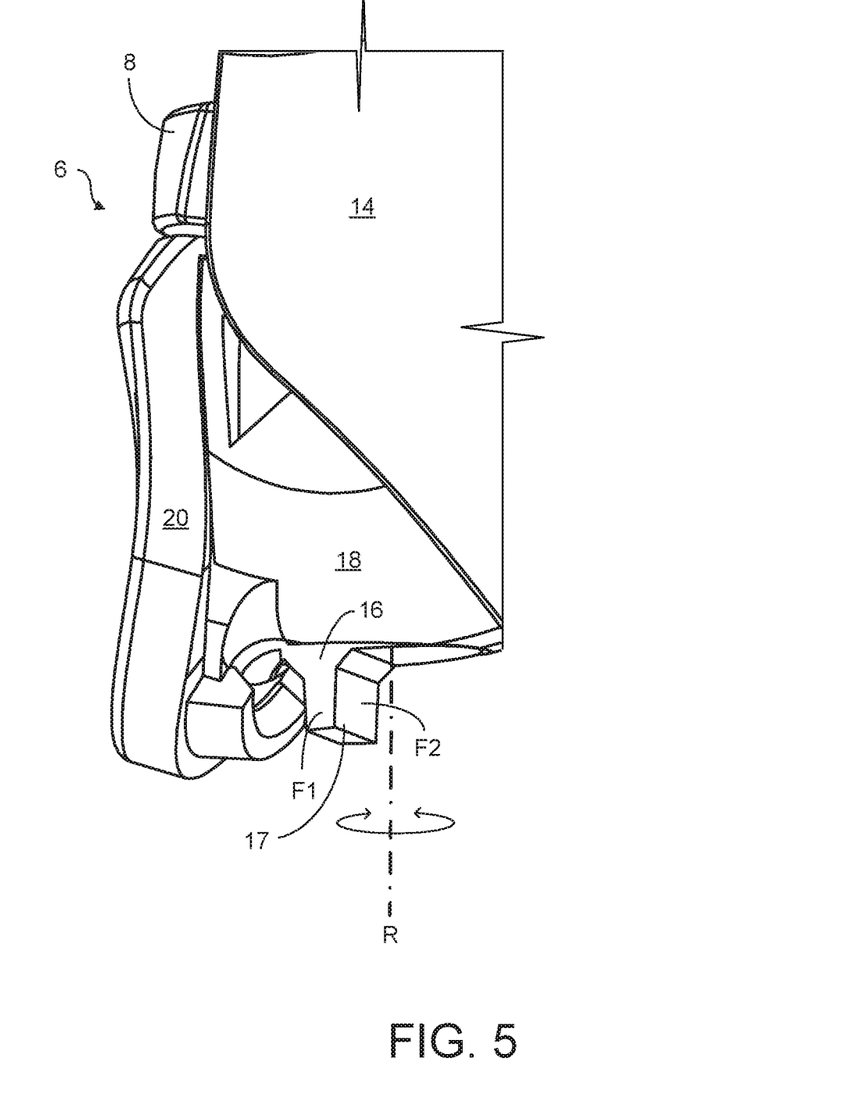
FIG. 5 is a perspective view from below of a trigger mechanism according to a first embodiment.
Figure 6:
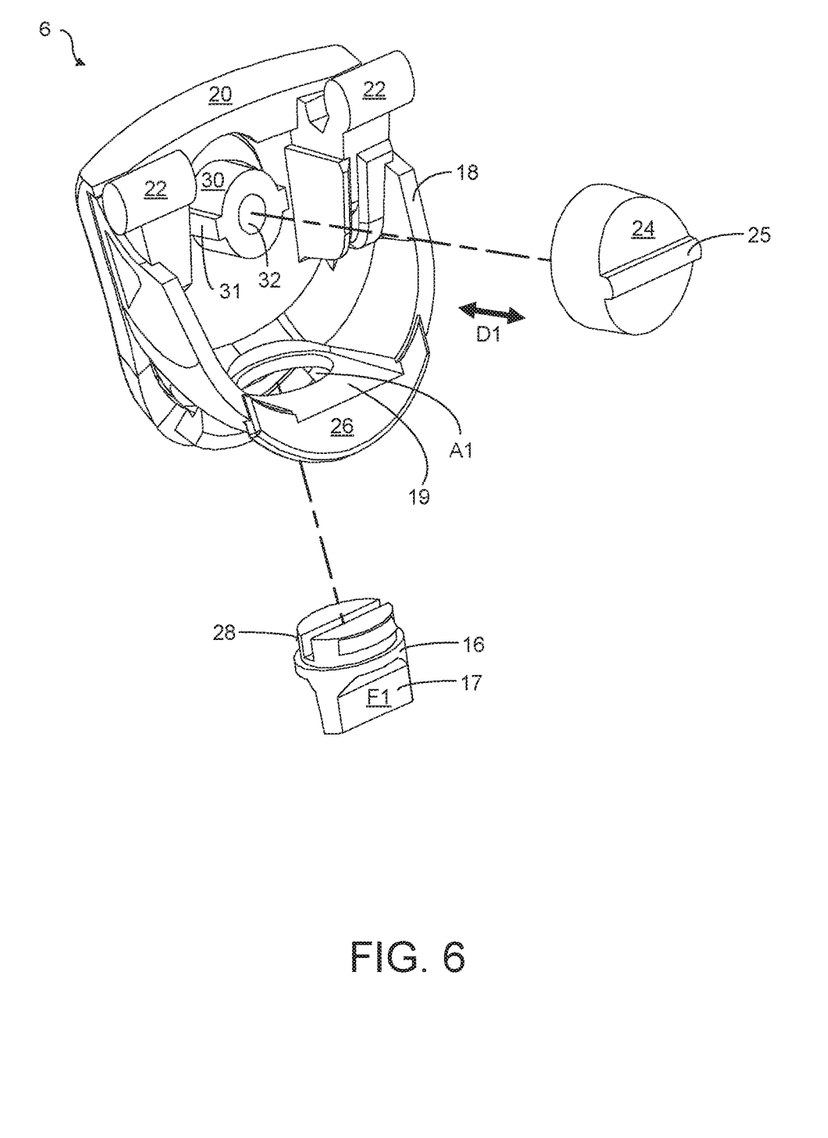
FIG. 6 is an exploded view of a trigger mechanism according to a first embodiment.

FIGS. 4 to 6 illustrate a trigger mechanism 6 for mounting in the apertures A of the housing 12. The Figures illustrate a left handed trigger mechanism; it will be appreciated that the right handed trigger mechanism is substantially the same in structure albeit a mirror image of that shown in FIGS. 4 to 6. The left and right trigger mechanisms 6, 7 will be described by reference to the left trigger mechanism 6.

The trigger mechanism 6 is movable through a predefined range of motion with respect to the housing 12.

The trigger mechanism 6 comprises a trigger body 18 which may be pivotally mounted to the housing 12; in the illustrated embodiment the trigger body is mounted to the back panel 14. The trigger mechanism 6 comprises a pair of trunnions 22 for pivotally mounting the trigger body 18 to the housing 12.

The trigger mechanism 6 comprises a sensor, not shown. The sensor may comprise a displacement transducer. The sensor may be analogue or digital in nature and arranged to measure a parameter indicative of the position of the trigger body 18 with respect to the housing 12 so as to sense or detect the position of the trigger body 18 with respect to the housing 12. For example, but not limited to, the sensor may take the form of: a potentiometer; a magnetic sensor; a Hall effect sensor; or a force or pressure sensitive switch or pad. The sensor is coupled to control electronics on a printed circuit board.

The trigger mechanism 6 comprises an interchangeable face plate 20. The face plate 20 is mounted to the trigger body 18 by a mechanical fixing such as a snap or bayonet style fitting.

The trigger mechanism 6 comprises a hair trigger mechanism for adjusting the start position or rest position of the trigger body 18 with respect to the back panel 14.

The trigger body 18 comprises a shaft 30 extending from an inner face of the trigger body 18. An orifice or bore 32 extends through the shaft 30 from a front surface of the trigger body 18 to the interior of the trigger body 18.

The face plate 20, when mounted to the trigger body 18, conceals or covers the orifice 32.

The shaft 30 comprises a pair of parallel keys 31 which mate with keyways in a cap 24. The cap 24 comprises an orifice or blind hole (not shown) for receiving the shaft 30. In alternative embodiments the shaft 30 may comprise one or more keys 31 or keyways or may comprise a spline. The keys 31 prevent rotation of the cap 24 when mounted upon the shaft 30.

A screw (not shown) is mounted into the bore 32 of the shaft 30. The bore 32 may comprise an internal screw thread. In alternative embodiments the screw may be a self-tapping screw and may cut into the side wall of the bore 32. Optionally the screw is a grub screw.

The screw can be adjusted to bear against an interior face of the cap 24. In this way the position of the cap 24, with respect to the inner face of the trigger body 18, can be adjusted. The cap 24 is translationally or slideably mounted upon the shaft 30.

In use the pressure sensitive switch is disposed such that the cap 24 cannot be unintentionally dislodged from the shaft 30. However, in alternative embodiments, the cap 24 and shaft 30 may comprise an end stop which prevents the cap detaching from the shaft 30. For example, the cylindrical wall of the cap 24 may comprise a bore extending therethrough. A second screw may be received in the bore and partially extend into the interior of the cap 24. A channel may extend longitudinally along the shaft 30. The channel may be closed at a first end distal from the inner face to which the shaft 30 is mounted. The second screw may be received in the channel thereby preventing rotation of the cap 24 with respect to the shaft 30. The closed end of the channel forms an end stop preventing separation of the cap 24 from the shaft 30.

The cap 24 comprises a projection 25 in the form of a rib which defines a contact surface which bears against the pressure sensitive switch.

The cap 24 and shaft 30 form a telescopic arrangement which can be extended and retracted so as to adjust the distance between the contact surface and the inner face of the trigger body 18.

The trigger mechanism 6 comprises a resilient biasing mechanism. The resilient biasing mechanism may take the form of a spring mounted between the trigger mechanism 6 and the controller housing 12. The spring biases the trigger body 18 to a start or rest position. In alternative embodiments, the resilient biasing mechanism may be incorporated, or integral, with the pressure sensitive switch and arranged such that when the pressure sensitive switch returns to its unbiased or relaxed condition the trigger body 18 is returned to the start or rest position.

In embodiments employing a force or pressure sensitive switch, the hair trigger mechanism may be adjusted such that the cap 24 bears against the pressure sensitive switch and at least partially depresses or activates the pressure sensitive switch. In this way the trigger mechanism applies preload (an adjustable degree of pressure or force) to the pressure sensitive switch. In applications which require a preset magnitude of pressure or force to be applied to the pressure sensitive switch in order to initiate a command instruction, the degree of movement of the trigger body 18 necessary to initiate the command instruction is reduced. In this way the latency of the trigger mechanism 6 is reduced.

In embodiments employing a potentiometer, the start or rest position of a sliding contact or wiper with respect to a resistive element, with which it is in electrical contact, is adjusted.

In embodiments employing a magnetic sensor such as a Hall effect sensor, a magnetic sensor can be mounted or integrally formed with the cap 24. The location of the cap 24 with respect to the magnetic sensor can be adjusted so as to reduce the latency in the trigger movement.

The trigger mechanism 6 comprises an adjustable stop mechanism 16. The adjustable stop mechanism 16 provides an adjustable end stop for limiting the range of motion of the trigger body 18. The adjustable stop mechanism 16 defines the maximum displacement or depression of the trigger body 18 with respect to the back panel 14. The adjustable stop mechanism 16 allows manual adjustment of the depressible range of the trigger mechanism 6.

The trigger body 18 comprises a base wall 19. The base wall 19 comprises an aperture A1. The adjustable stop mechanism 16 comprises a detent 17 and a rotational mount 28. The rotational mount 28 comprises a snap or push fitting including two opposed barbs. The detent 17 extends or projects downwardly from the base wall 19 of the trigger body 18.

The detent 17 comprises a pair of opposed surfaces F1, F2 each of which may arrest the travel of the trigger mechanism 6. The detent 17 is disposed eccentrically or off-center.

Figure 7:
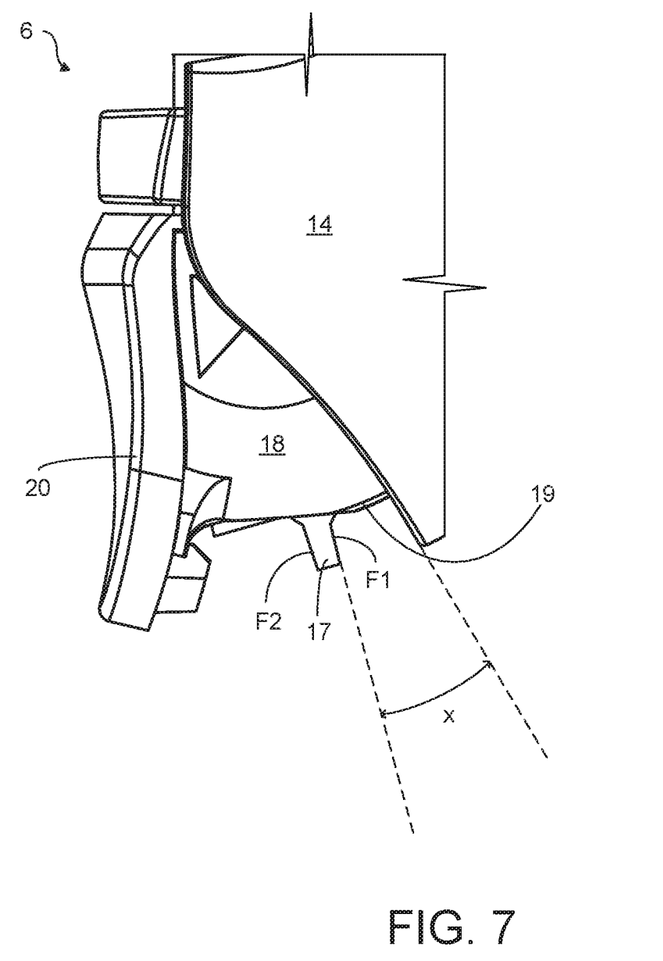
FIG. 7 is a side view of a trigger mechanism according to a first embodiment in which a stop mechanism is in a second condition.
Figure 8:
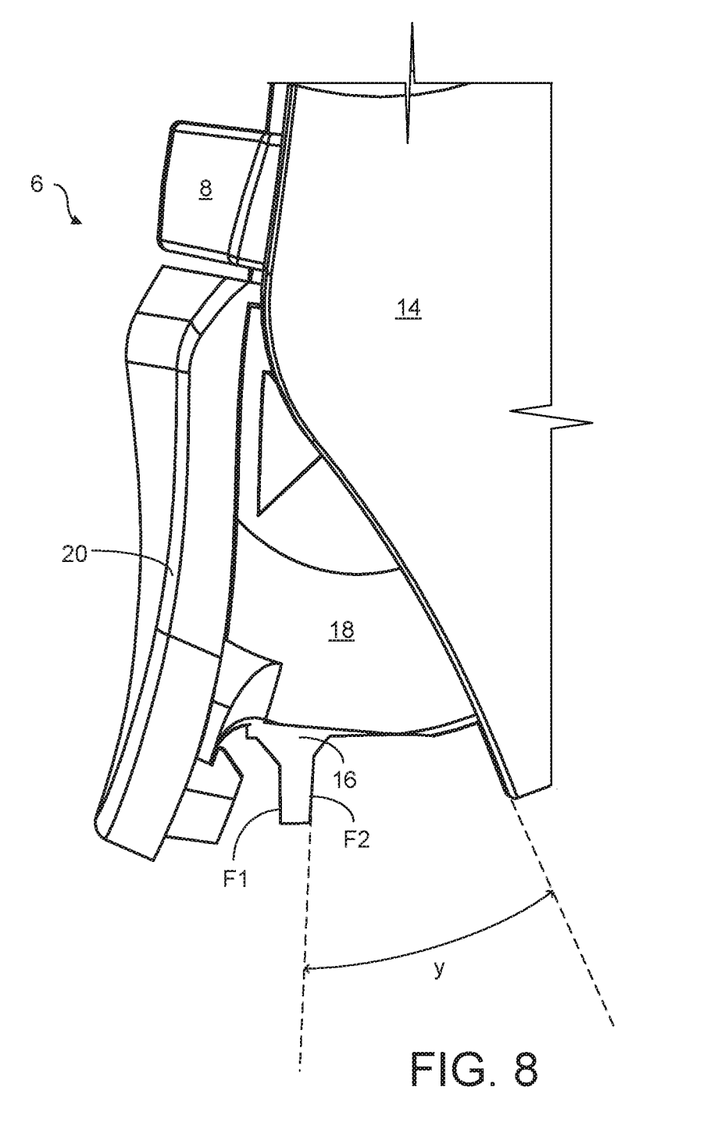
FIG. 8 is a side view of a trigger mechanism according to a first embodiment in which a stop mechanism is in the first condition.
Figure 9:
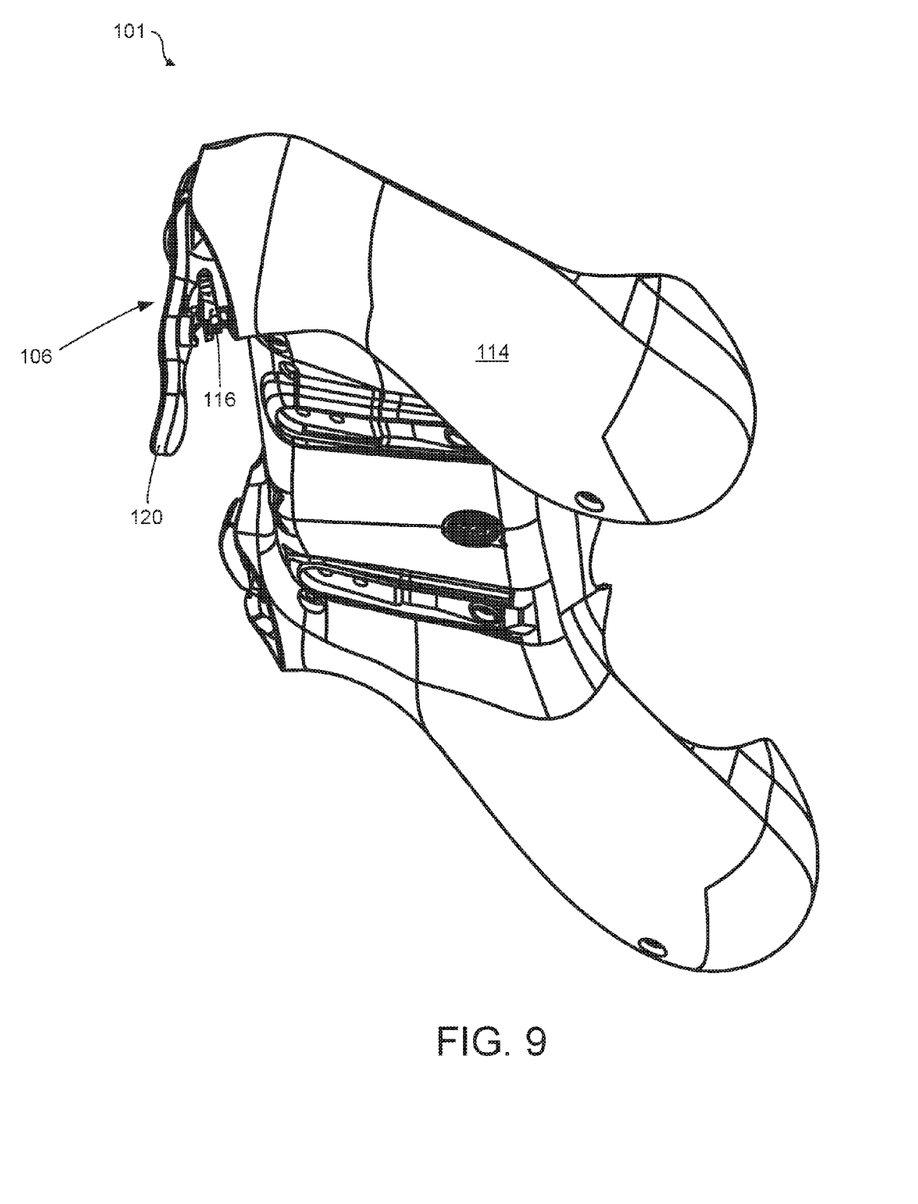
FIG. 9 is a perspective view from below of the rear panel of a games console controller according to a second embodiment.

The detent 17 is rotatable between a first, stowed, position shown in FIG. 8 and a second, deployed, position shown in FIG. 7. The range of motion or degree of travel of the trigger mechanism 6 can be adjusted by rotating the detent 17 between the first and second positions.

In the first position, the second surface F2 faces or opposes the back panel 14. When the trigger mechanism 6 is depressed sufficiently the second surface F2 is brought into contact with a portion of the back panel 14 thereby arresting the motion of the trigger mechanism 6. In the first position, the trigger mechanism 6 is moveable through a range of travel 'y'.

In the second position, the first surface F1 faces or opposes the back panel 14. When the trigger mechanism 6 is depressed sufficiently the first surface F1 is brought into contact with a portion of the back panel 14 thereby arresting the motion of the trigger mechanism 6. In the second position, the trigger mechanism 6 is moveable through a range of travel 'x'.

The range of travel 'y' is greater than the range of travel 'x'.

The detent 17 is rotatable about an axis extending substantially radially or perpendicularly from the base wall 19 of the trigger body 18, as shown in FIG. 5.

In some embodiments, the detent 17 is detachable; this may allow a greater or larger range of travel of the trigger mechanism 6.

Referring now to FIGS. 9 to 12, there is shown an alternative embodiment of the present invention. In the second illustrated embodiment like numerals have, where possible, been used to denote like parts, albeit with the addition of the prefix "100" to indicate that these features belong to the second embodiment. The alternative embodiment shares many common features with the first embodiment and therefore only the differences from the embodiment illustrated in FIGS. 1 to 8 will be described in any greater detail.

The controller 101 of the second embodiment comprises an elongated face plate 120. The face plate 120 is detachably mounted to a trigger body 118.

The trigger mechanism 106 comprises an adjustable stop mechanism 116. The adjustable stop mechanism 116 provides an adjustable end stop for limiting the range of motion of the trigger body 118. The adjustable stop mechanism 116 defines the maximum displacement or depression of the trigger body 118 with respect to the back panel 114. The adjustable stop mechanism 116 allows manual adjustment of the depressible range of the trigger mechanism 106.

Figure 10:
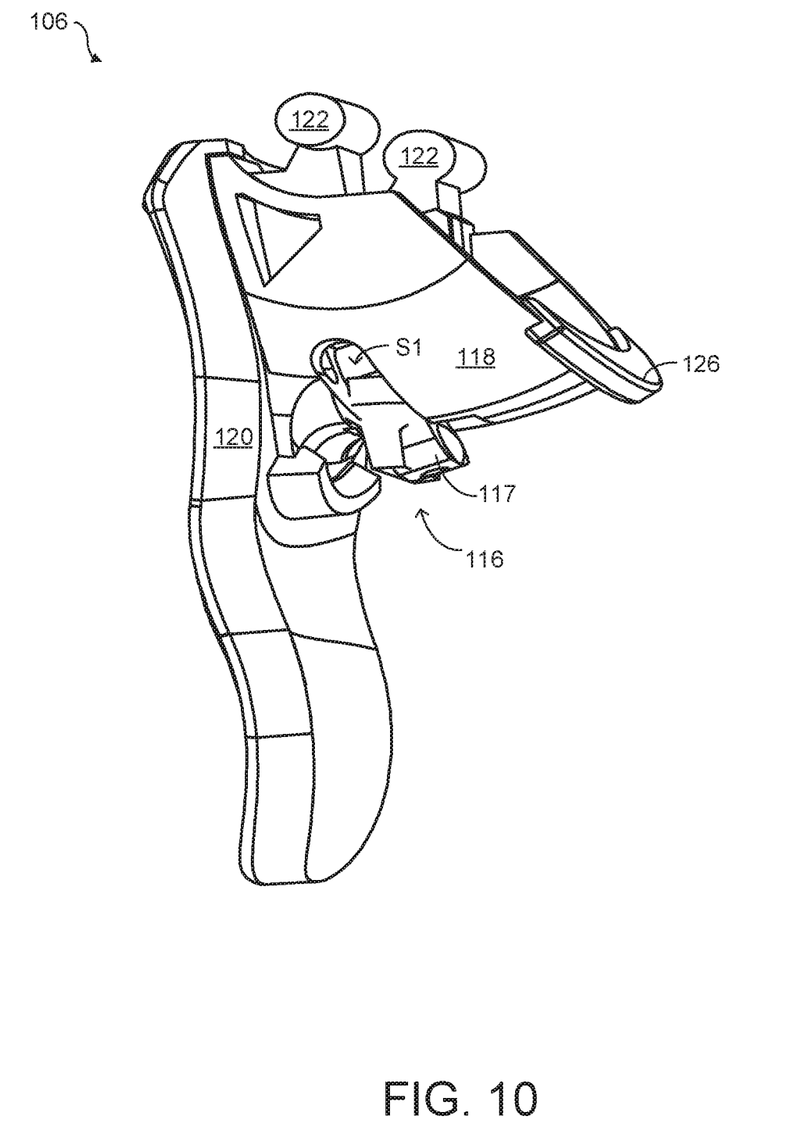
FIGS. 10 and 11 are perspective views from below of a trigger mechanism according to the second embodiment.
Figure 11:
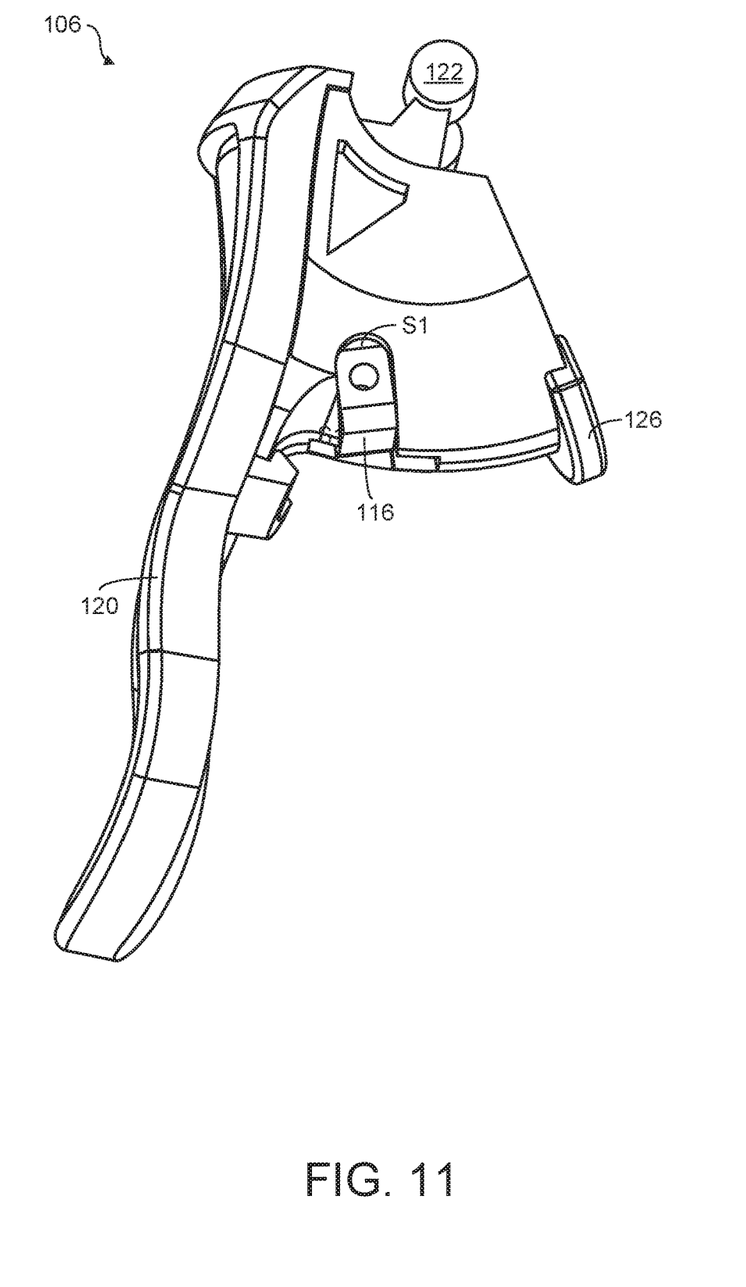
Figure 12:
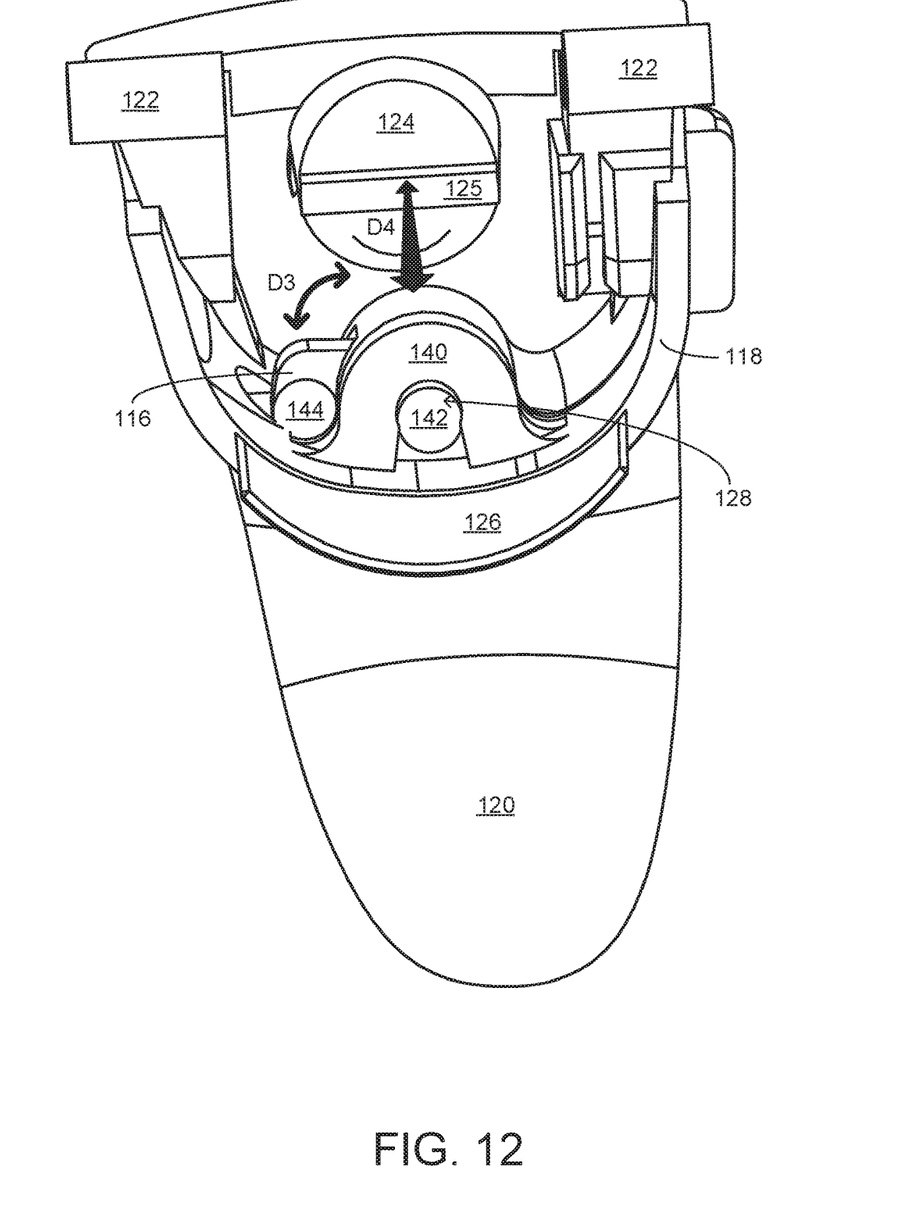
FIG. 12 is an internal view of the trigger mechanism of FIGS. 10 and 11.

The trigger body 118 comprises a base wall 119. The base wall 119 comprises a cutaway or slot S1. The adjustable stop mechanism 116 comprises an elongated detent 117 and a rotational mount 128 in the form of a pair of second trunnions 142. The second trunnions 142 are locatable in a receiver 140 in the form of a partial cylinder. The rotational mount 128 comprises a snap or push fitting for holding the detent 117 in the receiver 140.

The detent 117 is rotatable between a retracted or stowed position, in which the detent 117 lies substantially within the interior of the trigger body 118, and a deployed position in which the detent 117 extends or projects downwardly from the base wall 119 of the trigger body 118.

The detent 117 comprises a contact surface which arrests the travel of the trigger mechanism 106. The detent 117 is disposed eccentrically or off-center.

The detent 117 optionally comprises a retainer 144, which may take the form of a snap or push fitting, for retaining the detent 117 in the stowed position.

One advantage of the present invention is that it allows adjustments to be made to the trigger response; such adjustment could be customized to suit both the nature of the video game that is in use at the time of operation, and the skill of the operator. For example, in combat-style games involving a shooting function, it is often the case that after reaching or passing the command initiation point, no further commands are initiated. In such games further depression of the trigger mechanism 6, 106, and hence movement of the displacement transducer or sensor, serves no useful purpose. Therefore the adjustable stop mechanism 16, 116, which controls the degree of trigger depression, allows the operator to restrict the amount of travel available to the trigger body 18, 118 to one of the predefined degrees of travel provided by the adjustable stop mechanism 16, 116. The adjustable stop mechanism 16, 116, when employing face F1 or face F2, impedes the movement of the trigger body 18, 118 by striking the housing 12.

Such an adjustment would directly relate to the majority of combat style games or other varieties of firing operations in video games.

The faces F1 and F2 could find application in a variety of other video game genres but for the simplicity of this disclosure, reference is made to combat style games. In some other gaming styles, such as driving or flight simulations, the trigger buttons 6, 7 are employed for throttle control command function and/or a braking control command function. In this application, the degree of depression of the trigger body 18, 118 is detected by the displacement transducer. The degree of depression of the trigger body 18, 118 is converted into a signal, which signal directly relates to a command to be executed by the video game, for example the amount of acceleration or braking to be applied. In such games it may be desirable to be able to fully depress the trigger body 18, 118, for example when full depression corresponds to maximum throttle or maximum braking. Restricting travel of the trigger body 18, 118 would restrict the throttle control command function where the degree of travel of the trigger body 18, 118 is proportional to the speed of the vehicle of the simulation. In such gaming styles, the face F1 could be configured to allow full trigger depression. However, it will be appreciated that in such games it may be desirable to control the trigger response by adjustment of the adjustable stop mechanism 16, 116, to allow the operator to restrict the braking and accelerating functions of the game, for example restricting maximum throttle settings and braking level settings for difficult corners.

A further advantage of the present invention is that it minimizes the amount of motion an operator's finger must travel, therefore minimizing the recovery time after trigger initiation contacts have been made. This allows the operator to rapidly commence command prompt repeatedly, or to operate different commands more quickly. As the movement that is required to operate commands by depressing the trigger body 18, 118 is reduced to only that which is required, the risks of any related repetitive strain injury acquired due to the repeated movement of the finger when operating the trigger function would be greatly reduced thereby providing a health benefit to users.

The present invention provides a readily adjustable device to restrict the range of movement of the trigger body 18, 118 to one of a plurality of predefined ranges. A further advantage of this embodiment is that the ergonomic design of the controller is not compromised.

Further, it will be appreciated that the adjustable stop mechanism 16, 116 can be removed from the trigger body 18, 118. A replacement adjustable stop mechanism 16, 116 can be inserted and secured. The replacement may provide additional or alternative predefined ranges of motion of the trigger body 18, 118. The adjustable stop mechanism 16, 116 may comprise faces which are game specific; that is to say, tailored to suit a particular game.

Dependent upon the video game being played, it can be necessary to depress the trigger a distance before the trigger initiation point is reached and the command actually acknowledged. This initial movement of the trigger body is unnecessary and wasteful. Adjusting the start position is advantageous since it removes this unnecessary travel, thus reducing the time taken to initiate a command and thereby improving the responsiveness of the trigger. In combat style games, this can simulate a "hair-trigger" function.

It can be appreciated that various changes may be made within the scope of the present invention. For example, in alternative embodiments, the cap 24 may be omitted. A screw (not shown) may be mounted within the bore 32 of the shaft 30. A first end of the screw may form an abutment surface which acts upon a transducer such as a pressure sensor.

In still other embodiments the cap 24 may comprise an internal screw thread and the shaft 30 may comprise an external screw thread matingly received in the internal screw thread. An inner face of the end wall of the cap 24 may comprise a screw drive such as a hex drive or torx drive or other suitable arrangement for application of torque to the cap 24.

In this way the cap 24 or the screw or both form a second part of a linear actuator, the shaft forming a first part of a linear actuator, the position of the second part with respect to the first part being manually adjustable so as to alter the linear dimension of the linear actuator. The linear actuator is in communication with a transducer or sensor which determines the position of the depressible trigger mechanism with respect to the housing of the controller.

It will be recognized that as used herein, directional references such as "top", "bottom", "front", "back", "end", "side", "inner", "outer", "upper" and "lower" do not limit the respective features to such orientation, but merely serve to distinguish these features from one another.

While particular embodiments of the invention have been shown and described, numerous variations and alternate embodiments will occur to those skilled in the art without departing from the scope of the present invention.

What is claimed is:

1. A trigger mechanism for a games controller for controlling electronic games, the trigger mechanism comprising:
   a trigger body having a plurality of walls defining an internal chamber, the plurality of walls including a base wall and an orifice defined in the base wall; and
   a detent detachably mounted on the trigger body, the detent at least partially received in the orifice; and
   wherein:
   the detent is rotatable with respect to the trigger body; and
   the detent comprises at least one abutment surface, eccentrically arranged with respect to the rotational axis of the detent.

2. The trigger mechanism of claim 1 wherein the detent comprises a push fitting for securing the detent to the trigger body.

3. The trigger mechanism of claim 1 wherein the detent is rotatable between a first position and a second position.

4. The trigger mechanism of claim 3 wherein in the first position the detent is stowed within the interior chamber of the trigger body.

5. The trigger mechanism of claim 4 wherein the detent comprises a pair of oppositely disposed trunnions receivable in a partial cylinder provided by a receiver disposed within the interior chamber.

6. The trigger mechanism of claim 1 wherein the detent comprises a pair of opposing surfaces.

7. The trigger mechanism of claim 6 wherein the detent is rotatable about an axis which extends through the base wall.

8. The trigger mechanism of claim 7 wherein the detent rotates about an axis substantially perpendicular to the plane of the base wall.

9. The trigger mechanism of claim 7 wherein the detent rotates about an axis extending substantially radially from an outer surface of the base wall.

10. The trigger mechanism of claim 1 wherein the detent is toolessly detachable from the trigger body.

11. The trigger mechanism of claim 1 wherein the at least one abutment surface is rotatable from a first position and a second position, the abutment surface being disposed in closer proximity to the rotational axis of the detent in the second position than in the first position.

12. The trigger mechanism of claim 1 comprising a face plate detachably mounted to the trigger body and wherein the detent is disposed behind the face plate.

13. An apparatus for supplying user inputs to a computer program for controlling the computer program, the apparatus comprising at least one depressible trigger mechanism, the trigger mechanism comprising: a trigger body having a detent for manual adjustment of a depressible range of motion of the trigger mechanism; and wherein:

the trigger body comprises a plurality of walls, including a base wall, the plurality of walls defining an interior chamber of the trigger body; and the base wall comprises an orifice for receiving at least in part the detent, the detent being detachably mounted to the trigger body and being rotatable with respect to the trigger body; and the detent comprises at least one abutment surface eccentrically arranged with respect to the rotational axis of the detent.

14. The apparatus of claim 13 wherein the detent is rotatable between a first position and a second position, the trigger mechanism being depressible through a first range when the detent is in the first position and through a second range when the detent is in the second position, the second range being shorter than the first range.

15. The apparatus of claim 13 wherein the apparatus comprises a casing wherein rotation of the detent through 180 degrees rotates a first one of the abutment surfaces from a position facing towards the casing to a position facing away from the casing.

16. The apparatus of claim 13 wherein the detent comprises a pair of opposed abutment surfaces.

17. The apparatus of claim 13 wherein the computer program is a game program and the apparatus is a hand held controller for a games console comprising an outer case, and a plurality of controls are located on a front and a top of the controller;

the controller being shaped to be held in both hands of a user such that the user's thumbs are positioned to operate controls located on the front of the controller and the user's index fingers are positioned to operate controls located on the top of the controller.

18. A trigger mechanism for a games controller for controlling electronic games, the trigger mechanism comprising:

a trigger body having a plurality of walls defining an internal chamber, the plurality of walls including a base wall and an orifice defined in the base wall; and a detent detachably mounted on the trigger body, the detent at least partially received in the orifice; and wherein:

the detent is rotatable with respect to the trigger body;

the detent comprises at least one abutment surface, eccentrically arranged with respect to the rotational axis of the detent; and the at least one abutment surface is rotatable from a first position and a second position, the abutment surface being disposed in closer proximity to the rotational axis of the detent in the second position than in the first position.

* * * * *